(12) United States Patent
Hartop

(10) Patent No.: US 7,376,747 B2
(45) Date of Patent: May 20, 2008

(54) STREAMING OF DATA

(75) Inventor: Scott Hartop, London (GB)

(73) Assignee: NCR Corporation, Dayton, OH (US)

( * ) Notice: Subject to any disclaimer, the term of this patent is extended or adjusted under 35 U.S.C. 154(b) by 1252 days.

(21) Appl. No.: 10/007,464

(22) Filed: Dec. 5, 2001
(Under 37 CFR 1.47)

(65) Prior Publication Data

US 2002/0161898 A1 Oct. 31, 2002

(30) Foreign Application Priority Data

Dec. 20, 2000 (GB) ................................. 0031157.1

(51) Int. Cl.
*G06F 15/16* (2006.01)
(52) U.S. Cl. ................. 709/233; 709/224; 709/231; 709/235; 709/249; 370/230; 370/230.1; 370/231; 370/237
(58) Field of Classification Search ........ 709/231–242, 709/249, 230, 203; 370/230, 230.1, 231, 370/237
See application file for complete search history.

(56) References Cited

U.S. PATENT DOCUMENTS

| | | | | |
|---|---|---|---|---|
| 4,825,434 | A | * | 4/1989 | Shaio .......................... 370/468 |
| 5,485,455 | A | * | 1/1996 | Dobbins et al. ............. 370/255 |
| 5,640,384 | A | * | 6/1997 | Du .............................. 370/221 |
| 5,719,861 | A | * | 2/1998 | Okanoue .................... 370/351 |
| 5,784,527 | A | * | 7/1998 | Ort ............................. 386/111 |
| 5,806,075 | A | * | 9/1998 | Jain et al. .................... 707/201 |
| 5,970,052 | A | * | 10/1999 | Lo et al. ...................... 370/241 |
| 5,987,376 | A | * | 11/1999 | Olson et al. ................ 701/201 |
| 5,991,812 | A | * | 11/1999 | Srinivasan .................. 709/232 |
| 6,078,953 | A | * | 6/2000 | Vaid et al. ................... 709/223 |

(Continued)

FOREIGN PATENT DOCUMENTS

EP 1217803 A1 * 6/2002

(Continued)

OTHER PUBLICATIONS

Measurement-based optimization techniques for bandwidth-demanding peer-to-peer systems, by Ng., Rao, Zhang, IEEE INFOCOM 2003.*

(Continued)

*Primary Examiner*—John Follansbee
*Assistant Examiner*—Backhean Tiv
(74) *Attorney, Agent, or Firm*—Gates & Cooper LLP

(57) ABSTRACT

A method of optimizing data streaming in a peer-to-peer architecture that comprises a plurality of clients in a chain, a peer-to-peer data streaming system having such architecture, and a client terminal for use in that system. Each client monitors its own bandwidth, informs a succeeding client in the chain of that bandwidth, compares its own bandwidth with the bandwidth of a preceding client in the chain and, in response to a difference between the compared bandwidths, reorders its position among the clients in the chain. The chain thus dynamically self-organizes itself to stream data more efficiently and with higher, more reliable throughput, reducing the processing power necessary to stream the data and enabling higher quality to be achieved within the existing internet infrastructure. This also solves the 'bottleneck' problem within the cascaded streaming path by continuously organizing the participating terminals into the most efficient configuration, without interrupting the streamed data.

26 Claims, 2 Drawing Sheets

U.S. PATENT DOCUMENTS

| | | | |
|---|---|---|---|
| 6,243,391 B1 * | 6/2001 | Holmquist | 370/458 |
| 6,282,175 B1 * | 8/2001 | Steele et al. | 370/254 |
| 6,343,085 B1 * | 1/2002 | Krishnan et al. | 370/468 |
| 6,385,673 B1 * | 5/2002 | DeMoney | 710/60 |
| 6,418,503 B1 * | 7/2002 | Moertl et al. | 710/310 |
| 6,421,329 B1 * | 7/2002 | Kikinis | 370/329 |
| 6,502,131 B1 * | 12/2002 | Vaid et al. | 709/224 |
| 6,557,041 B2 * | 4/2003 | Mallart | 709/231 |
| 6,631,118 B1 * | 10/2003 | Jones | 370/252 |
| 6,631,409 B1 * | 10/2003 | Watson et al. | 709/224 |
| 6,665,264 B1 * | 12/2003 | Davison et al. | 370/230 |
| 6,665,273 B1 * | 12/2003 | Goguen et al. | 370/252 |
| 6,687,224 B1 * | 2/2004 | Ater et al. | 370/254 |
| 6,687,240 B1 * | 2/2004 | Moertl et al. | 370/351 |
| 6,760,774 B1 * | 7/2004 | Soumiya et al. | 709/233 |
| 6,765,872 B1 * | 7/2004 | Tazaki | 370/235 |
| 6,791,949 B1 * | 9/2004 | Ryu et al. | 370/254 |
| 6,813,654 B1 * | 11/2004 | Ishibashi | 710/36 |
| 6,842,430 B1 * | 1/2005 | Melnik | 370/254 |
| 6,850,763 B1 * | 2/2005 | Naqvi et al. | 455/448 |
| 6,876,668 B1 * | 4/2005 | Chawla et al. | 370/468 |
| 7,174,385 B2 * | 2/2007 | Li | 709/231 |
| 7,197,565 B2 * | 3/2007 | Abdelaziz et al. | 709/226 |
| 2002/0040479 A1 * | 4/2002 | Ehrman et al. | 725/95 |
| 2002/0073204 A1 * | 6/2002 | Dutta et al. | 709/227 |
| 2004/0042402 A1 * | 3/2004 | Galand et al. | 370/237 |

FOREIGN PATENT DOCUMENTS

| WO | WO 99/11081 | 3/1999 |
|---|---|---|
| WO | WO 00/02345 | 1/2000 |

OTHER PUBLICATIONS

Jonas K. et al. "Audio Streaming on the Internet. Experiences With Real-Time Streaming of Audio Streams." Industrial Electronics, 1997. ISIE '97., Symposium on Guimaraes, Portugal Jul. 7-11 1997, pp. SS71-SS76, XP010265142.

* cited by examiner

STREAMING OF DATA

BACKGROUND OF THE INVENTION

This invention relates to streaming of data, and more generally to the distribution of rich media and data on-line and over any network, notably the Internet.

Streaming technology is a major growth area in the Internet field. It helps to satisfy public demand for large multimedia files by allowing parts of such a file to be displayed, played or otherwise accessed and used while other parts of the file are still downloading. In this way, streaming helps users whose terminals have insufficient access speed, memory and processing capabilities for them to be able to download complete multimedia files quickly enough to enjoy their use.

Examples of streaming formats are RealVideo and RealAudio developed by RealNetworks, Inc. (all trade marks acknowledged). With suitable plug-ins on their browser programs, users with even modestly-specified terminals and modems can enjoy streamed data such as a live audio/video feed from a concert.

Streaming relies upon the client terminal collecting data and sending that data as a steady stream to an application that processes the data, for example by converting that data to sound and/or pictures. Despite the use of a buffer to store an excess of incoming data and hence to insulate the application from interruptions in the incoming data stream, it often happens that the data does not arrive quickly enough to replenish the buffer. For example, network congestion can arise due to the essentially client/server architecture of the Internet. The result is a lack of smoothness in the data stream presented to the application and consequential loss in the quality of the user's experience, manifested by interruptions and other degradation.

Even if the data stream is smooth enough to allow continuity, the quality of the data, for example in terms of image resolution and image size, is often poor. Put simply, the quality of the data equates to the rate at which information is transmitted, in terms of the amount of data transmitted in a given time, and this rate is compromised in an effort to ease downloading, to make it easier to keep the buffer replenished, and to minimize interruptions in the data stream.

In today's predominantly client/server Internet architecture, high concurrency rates place bandwidth-intensive demands on servers dedicated to the streaming of continuous data. This drastically compromises the quality and reliability of the end-user's experience. It also results in high hardware overheads for streaming service providers, who need to maintain banks of specialized servers.

SUMMARY OF THE INVENTION

Against this background, the invention resides in a method of optimizing data streaming in a peer-to-peer architecture comprising a plurality of clients in a chain, the method comprising each client monitoring its own bandwidth, informing a succeeding client in the chain of that bandwidth, comparing its own bandwidth with the bandwidth of a preceding client in the chain and, in response to a difference between the compared bandwidths, reordering its position among the clients in the chain.

Similarly, the invention can be expressed in terms of a peer-to-peer data streaming system comprising a plurality of clients in a chain, each client including bandwidth-monitoring means for monitoring its own bandwidth, communication means for informing a succeeding client in the chain of that bandwidth, comparison means for comparing its own bandwidth with the bandwidth of a preceding client in the chain, and reconfiguration means responsive to a difference between the compared bandwidths to reorder its position among the clients in the chain.

From the client perspective, the invention resides in a client terminal for use in a peer-to-peer data streaming system that comprises a plurality of client terminals in a chain, the client terminal being configured or programmed to include bandwidth-monitoring means for monitoring its own bandwidth, communication means for informing a succeeding client terminal in the chain of that bandwidth, comparison means for comparing its own bandwidth with the bandwidth of a preceding client terminal in the chain, and reconfiguration means responsive to a difference between the compared bandwidths to reorder its position among the client terminals in the chain.

The client terminal can of course be a client computer such as a home or office PC but can take other forms such as, without limitation, a set-top box, a games console, a networked hi-fi system or other network device.

The invention therefore enables and provides a streaming architecture which uses a piece of software to link any networked computing device (referred to herein as clients or peers) in a continuous, dynamically self-organizing peer-to-peer chain for the purpose of streaming any kind of data more efficiently and with higher, more reliable throughput. That software is optionally downloadable or may be distributed in any convenient format. The invention also includes a client/server coordinating element to originate and monitor the chain, capable of handling appropriate content management and permissions functions.

This invention transfers streaming from the known client/server architecture to a peer-to-peer architecture, exponentially reducing the processing power necessary to stream any continuous data and enabling far higher quality (i.e. a higher rate of information transfer, with less interruptions) to be achieved within the existing internet infrastructure.

This invention also solves the potential 'bottle-neck' effect within the cascaded streaming path by dynamically self-organizing the participating terminals or networked devices into the most efficient configuration at any given moment, without interrupting the streamed information.

In the system or terminal of the invention, a client or client terminal preferably includes address-providing means for receiving and storing the address of a preceding or succeeding client or client terminal in the chain and providing that address to, respectively, the succeeding or preceding client or client terminal in the chain. Thus, for example, each client can identify a preceding client in the chain to the succeeding client in the chain. Similarly, the detecting client can identify a succeeding client in the chain to the preceding client in the chain.

If a detecting client detects that its bandwidth is greater than that of the preceding client in the chain then, in response, it opens a connection with a client upstream of the preceding client. In parallel, the preceding client in the chain can open a connection with the identified succeeding client.

In apparatus terms, the comparison means of a client or client terminal is associated with connection means for receiving the address of, and opening a connection with, a client or client terminal upstream of the preceding client or client terminal if the comparison means detects that the bandwidth of its associated client or client terminal is greater than that of the preceding client or client terminal in the chain.

The or each of the new connections is preferably opened concurrently with preexisting connections between clients in the chain. Once the or each concurrent connection has been made to a client, the or each associated pre-existing connection to that client can be dropped. In that event, the client advantageously switches to reading local buffer memory before the pre-existing connection is dropped.

In the reordered chain, therefore, the detecting client can receive streamed data from the client upstream of the preceding client and can forward that streamed data to the preceding client. For example, the pre-existing connection between the preceding client and the detecting client can be reversed, or a replacement connection can be opened between the preceding client and the detecting client. Similarly, in the reordered chain, the succeeding client can receive streamed data from the preceding client.

Once the chain has been reordered, a client preferably synchronizes a timecode of data in local buffer memory with a timecode of data received from a new streamed data input source before switching to data received from that source. The client can then replenish its local buffer memory.

The invention extends to an optionally-downloadable software application that is adapted to configure or program a client terminal to implement the inventive features expressed above.

BRIEF DESCRIPTION OF THE DRAWINGS

In order that this invention may be more readily understood, reference will now be made, by way of example, to the accompanying drawings in which.

DETAILED DESCRIPTION

A consumer interested in receiving any streamed data (for example, a live audio/video feed from a concert) first of all subscribes to the service. Having been granted membership, that consumer is able to download or otherwise obtain a software application to the networked device or terminal that the consumer intends to use to interpret or decode the streamed information. This application could be branded, can be customizable (for example by means of 'skins' that impose various attributes of appearance) and may feature additional functionality, but its core jobs are as follows:

1. Communicating briefly with a coordinating server to be allocated a starting place in a peer-to-peer chain of networked devices.

2. Having dropped this server connection, establishing a connection to the IP address allocated by the server, from which address the desired streaming signal can be received.

3. Providing 'repeater' functionality such that the application can pass on the encoded signal to a succeeding terminal or networked device in the chain (being the subsequent node in the peer-to-peer connection) without interrupting the signal, and also simultaneously decoding the incoming signal and relaying this to the appropriate playback device or application associated with the user's networked device. Of course, depending on the playback device or application, interpreting the codec may not be necessary.

4. As background functions:
   (a) obtaining bandwidth information by monitoring the connection speed of the host networked device or terminal, for example by averaging over a period of time a series of regular and frequent counts of the rate at which data is received (suitably measured in bits per second, say every 500 milliseconds);
   (b) providing a continuous (or frequently enough to be effectively continuous) update of this bandwidth information to the succeeding networked device or terminal in the chain, together with the IP address of the preceding networked device or terminal in the chain for use when adjusting the client streaming order, as will be described; and
   (c) comparing its own throughput rate with that of the preceding networked device or terminal in the chain.

5. As a result of learning that its host networked device or terminal is operating faster than the preceding networked device or terminal in the chain from which data is currently being received, the application manages the process of creating a new connection with the next preceding networked device or terminal, one link further up the chain. This involves the application seamlessly adjusting the position of its associated networked device in the chain or streaming cascade without disturbing the relative position of the streamed information, and then terminating the previous 'bottle-necking' connection.

6. Log the streaming activity of the machine for corroboration with the coordinating server at an appropriate future time.

Figure 1:
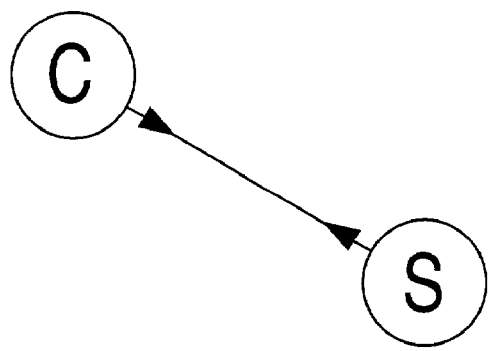
FIG. 1 is a diagram of a first step in the process of the invention, in which communication is established between a new client and a coordinating server.

Referring firstly then to FIG. 1 of the drawings, a new client C contacts a coordinating server S in normal client/server architecture. The server S processes the request according to subscription/membership details uploaded from the client C and once access is confirmed, passes to the client C a decryption key for the requested stream and the IP address of the last client that the server S processed and added to a chain.

Figure 2:
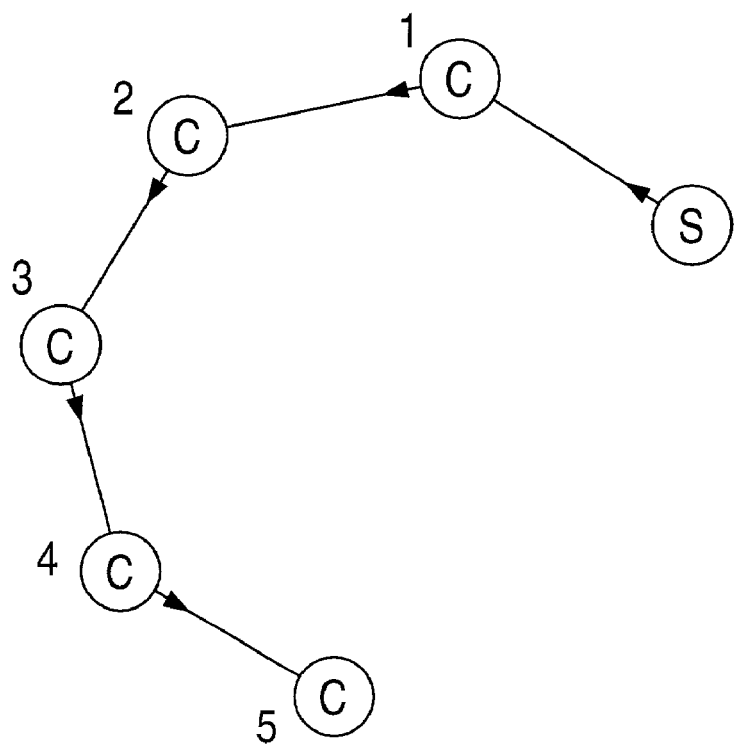
FIG. 2 is a diagram of a second step in the process of the invention, in which communication is established between the new client and another client from which the new client receives streamed data and forwards that data to other clients along a peer-to-peer chain.

FIG. 2 shows the next step in the process, in which the new client, which will henceforth be called Client 5, drops the connection to the server and switches to the allocated client identified by the server (this being Client 4, formerly the last in the chain). Client 5 then begins to receive streamed data from Client 4. That data is time-coded frame-by-frame.

Figure 3:
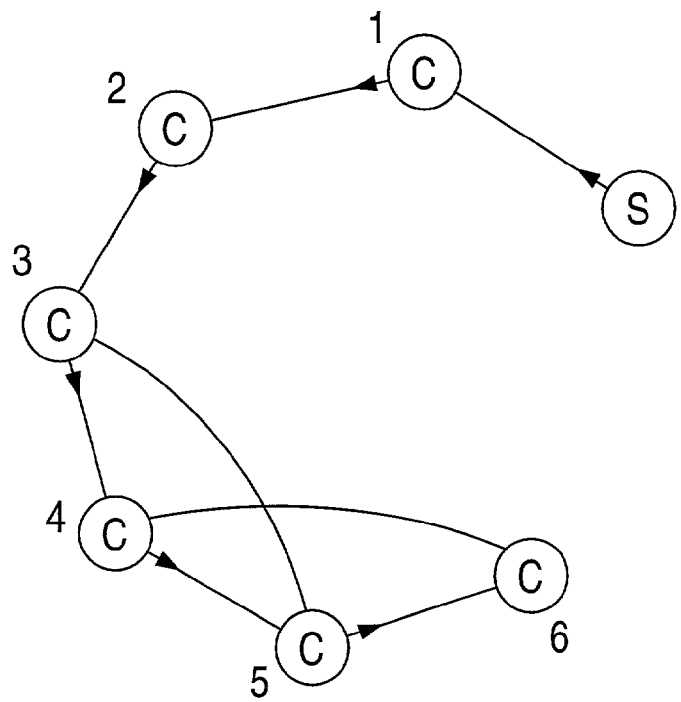
FIG. 3 is a diagram of a third step in the process of the invention, in which a further client joins the chain of FIG. 2 and concurrent connections are made between clients in preparation for re-routing data flow among the clients in the chain.

In FIG. 3, another client, namely Client 6, has joined the chain of FIG. 2. The above-mentioned bandwidth monitoring function run by Client 5 and taking bandwidth information from Client 4 detects that Client 5 is faster than Client 4, Client 4 thus presenting a potential bottleneck in comparison with Client 5. To avoid this, Client 5 briefly sends the IP address of Client 6 to Client 4, whereupon Client 4 forges a concurrent connection with Client 6. Meanwhile, Client 5 forges a concurrent connection with Client 3, whose IP address is already known to Client 5 because Client 4 included that IP address with the bandwidth information it sent to Client 5. That done, and in preparation for the steps shown in FIG. 4, Clients 4, 5 and 6 all switch to reading their local buffer memory of the streamed signal to preserve continuity in their output to their users.

Figure 4:
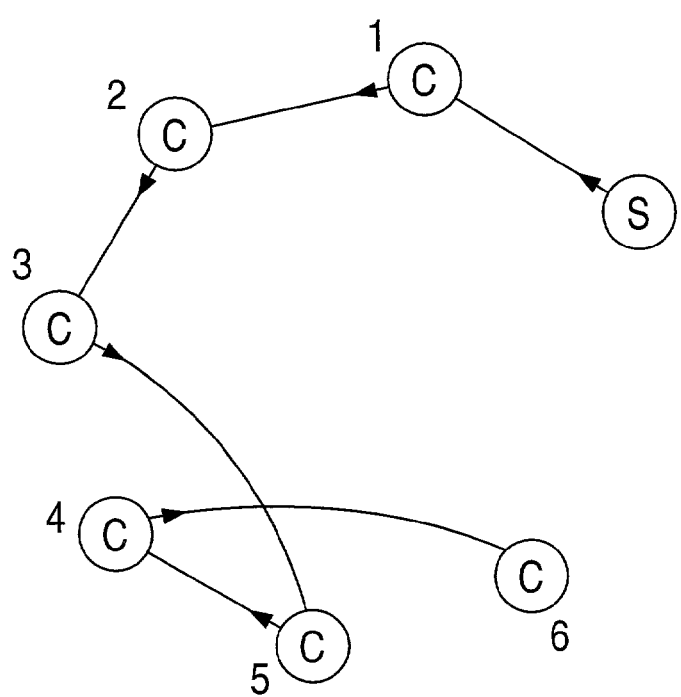
FIG. 4 is a diagram of a fourth step in the process of the invention, in which data flow has been re-routed among the clients in the chain.

In FIG. 4, having adjusted buffer times and synchronized timecode where necessary to ensure a contiguous stream:

Client 5 switches to receiving and processing the signal from Client 3 and reverses the direction of its connection to Client 4. In other words, Client 5 sends its cascaded output to the IP address of Client 4 (a new replacement connection may need to be established here to achieve this);

Client 4 switches to receiving and processing the streamed signal from Client 5 and outputting to Client 6; and the concurrent (but now unused) connections between Clients 3 and 4 and Clients 5 and 6 are dropped.

Using the timecode of the current frame being played from buffer memory to synchronize with the timecode of the new streamed input source, all clients revert to processing the streamed information and replenish their local buffers as quickly as connection speed allows.

It will be apparent from the foregoing that the chain has optimized itself according to local rules, without server coordination. Changes in available bandwidth at any point in the chain are dynamically resolved as they occur.

The last client in the chain can never be replaced via this self-organizing process in order that the coordinating server handling requests to join the chain knows the IP address that defines where to instruct newcomers to connect, bearing in mind that the server is not connected to a client in the chain while the chain reconfigures itself during self-optimization.

By means of the invention, a domestic user or consumer can, for example, launch the software, join a peer-to-peer chain streaming a piece of live theatre which is already in progress and automatically enjoy optimum network performance, regardless of the physical ceiling of the connection, whilst monitoring the show on their preferred home entertainment device such as a PC, a home cinema system and so on. The user may already have subscribed to and paid for this content, or could be billed on quitting the chain based on the amount of content actually streamed by their terminal.

What is claimed is:

1. A method of optimizing data streaming in a peer-to-peer architecture including a plurality of clients in a chain, the method comprising:
   each client monitoring its own bandwidth;
   each client informing a succeeding client in the chain of that bandwidth;
   each client comparing its own bandwidth with the bandwidth of a preceding client in the chain; and
   each client, in response to a difference between the compared bandwidths, reordering its position among the clients in the chain.

2. The method of claim 1, wherein each client identifies a preceding client in the chain to the succeeding client in the chain.

3. The method of claim 1, wherein a detecting client detects that its bandwidth is greater than that of the preceding client in the chain and, in response, opens a connection with a client upstream of the preceding client.

4. The method of claim 3, wherein the detecting client identifies a succeeding client in the chain to the preceding client in the chain.

5. The method of claim 4, wherein the preceding client opens a connection with the identified succeeding client.

6. The method of claim 3, wherein the or each of the connections is opened concurrently with pie-existing connections between clients in the chain.

7. The method of claim 3, wherein after the or each concurrent connection has been made to a client, the or each associated pie-existing connection to that client is dropped.

8. The method of claim 7, wherein the client switches to reading local buffer memory before the pre-existing connection is dropped.

9. The method of claim 5, wherein, in the reordered chain, the detecting client receives streamed data via the connection from the client that was upstream of the preceding client.

10. The method of claim 9, wherein the detecting client sends streamed data to the preceding client.

11. The method of claim 10, wherein the pre-existing connection between the preceding client and the detecting client is reversed.

12. The method of claim 11, wherein a replacement connection is opened between the preceding client and the detecting client.

13. The method of claim 9, wherein, in the reordered chain, the succeeding client receives steamed data via the connection from the preceding client.

14. The method of claim 1, wherein after the chain has been reordered, a client synchronizes a timecode of data in local buffer memory with a timecode of data received from a new steamed data input source before switching to data received from that source.

15. The method of claim 1, wherein a client replenishes its local buffer memory after the chain has been reordered.

16. A peer-to-peer data streaming system comprising:
   a plurality of clients in a chain, each client including bandwidth-monitoring means for monitoring its own bandwidth, communication means for informing a succeeding client in the chain of that bandwidth, comparison means for comparing its own bandwidth with the bandwidth of a preceding client in the chain, and reconfiguration means responsive to a difference between the compared bandwidths to reorder its position among the clients in the chain.

17. The system of claim 16, wherein a client includes address-providing means for receiving and storing the address of a preceding or succeeding client in the chain and providing that address to, respectively, the succeeding or preceding client in the chain.

18. The system of claim 16, wherein the comparison means of a client is associated with connection means for receiving the address of, and opening a connection with, a client upstream of the preceding client if the comparison means detects that the bandwidth of its associated client is greater than that of the preceding client in the chain.

19. The system of claim 18, wherein the connection means is capable of opening a connection concurrently with a pre-existing connection between clients in the chain.

20. The system of claim 19, wherein the connection means is responsive to making the concurrent connection to drop the associated pre-existing connection.

21. The system of claim 20, wherein the connection means is associated with switch means for switching the client to read local buffer memory before the pre-existing connection is dropped.

22. The system of claim 18, wherein the connection means is capable of reversing a pre-existing connection between clients in the chain.

23. The system of claim 16, wherein a client comprises data synchronizing means for synchronizing a timecode of data in local buffer memory with a timecode of data received form a new steamed data input source.

24. The system of claim 23, wherein a client comprises switch means responsive to the data synchronizing means to switch to data received from the new streamed data input source when the timecodes are synchronized.

25. A client terminal for use in a peer-to-peer data streaming system having a plurality of client terminals in a chain, the client terminal being configured or programmed to include bandwidth-monitoring means for monitoring its own bandwidth, communication means for informing a succeeding client terminal in the chain of that bandwidth, comparison means for comparing its own bandwidth with the bandwidth of a preceding client terminal in the chain, and reconfiguration means responsive to a difference between compared bandwidths to reorder its position among the client terminals in the chain.

26. A program storage medium readable by a computer having a memory, the medium tangibly embodying one or more programs of instructions executable by the computer to perform method steps for configuring or programming a client terminal for use in a peer-to-peer data streaming system having a plurality of client terminals in a chain, the method steps comprising the steps of:

configuring or programming the client terminal to monitor its own bandwidth;

configuring or programming the client terminal to inform a succeeding client terminal in the chain of that bandwidth;

configuring or programming the client terminal to compare its own bandwidth with the bandwidth of a preceding client terminal in the chain; and configuring or programming the client terminal to reorder its position among the client terminals in the chain based upon a difference between compared bandwidths.

* * * * *